(12) United States Patent
Cudak et al.

(10) Patent No.: US 11,138,074 B2
(45) Date of Patent: Oct. 5, 2021

(54) BACKUP PROTOCOL ADUSTMENT

(71) Applicant: Lenovo (Singapore) Pte. Ltd., Singapore (SG)

(72) Inventors: Gary David Cudak, Wake Forest, NC (US); Ronald F. Ridgeway, Jr., Holly Springs, NC (US); Alexander Verrigni, Cary, NC (US); John Petersen, Wake Forest, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 40 days.

(21) Appl. No.: 16/366,588

(22) Filed: Mar. 27, 2019

(65) Prior Publication Data

US 2020/0310916 A1    Oct. 1, 2020

(51) Int. Cl.
*G06F 12/00* (2006.01)
*G06F 11/14* (2006.01)
*G06F 1/3212* (2019.01)

(52) U.S. Cl.
CPC ........ *G06F 11/1451* (2013.01); *G06F 1/3212* (2013.01); *G06F 11/1456* (2013.01)

(58) Field of Classification Search
CPC . G06F 11/1451; G06F 1/3212; G06F 11/1456
See application file for complete search history.

(56) References Cited

U.S. PATENT DOCUMENTS

| 8,244,678 B1 * | 8/2012 | Hartland | H04L 67/1095 707/610 |
| 2020/0042398 A1 * | 2/2020 | Martynov | G06F 3/0631 |
| 2020/0236121 A1 * | 7/2020 | Spurlock | G06F 11/1456 |
| 2020/0278901 A1 * | 9/2020 | Singh | G06N 5/048 |

* cited by examiner

*Primary Examiner* — John A Lane
(74) *Attorney, Agent, or Firm* — Ference & Associates LLC

(57) ABSTRACT

One embodiment provides a method, including: receiving, at an information handling device, an indication of unsaved data; determining, using a processor, whether an identified loss potential for the unsaved data necessitates an adjustment to a backup protocol for the information handling device; and adjusting, responsive to determining that the adjustment is necessitated, the backup protocol. Other aspects are described and claimed.

18 Claims, 3 Drawing Sheets

BACKUP PROTOCOL ADUSTMENT

BACKGROUND

Information handling devices ("devices"), for example smart phones, tablets, laptop and personal computers, other electronic devices, and the like, utilize various means to backup local data. For example, local data may be backed up, or saved, via transmission of the local data to another device, to another server, a combination thereof, and the like. Generally, a fixed backup protocol (i.e., a protocol set by an administrator and/or adjusted by a user) governs the frequency of the backup processes and the location to which the local data is transmitted.

BRIEF SUMMARY

In summary, one aspect provides a method, comprising: receiving, at an information handling device, an indication of unsaved data; determining, using a processor, whether an identified loss potential for the unsaved data necessitates an adjustment to a backup protocol for the information handling device; and adjusting, responsive to determining that the adjustment is necessitated, the backup protocol.

Another aspect provides an information handling device, comprising: a memory device that stores instructions executable by the processor to: receive an indication of unsaved data; determine whether an identified loss potential for the unsaved data necessitates an adjustment to a backup protocol for the information handling device; and adjust, responsive to determining that the adjustment is necessitated, the backup protocol.

A further aspect provides a product, comprising: a storage device that stores code, the code being executable by a processor and comprising: code that receives an indication of unsaved data; code that determines whether an identified loss potential for the unsaved data necessitates an adjustment to a backup protocol; and code that adjusts, responsive to determining that the adjustment is necessitated, the backup protocol.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
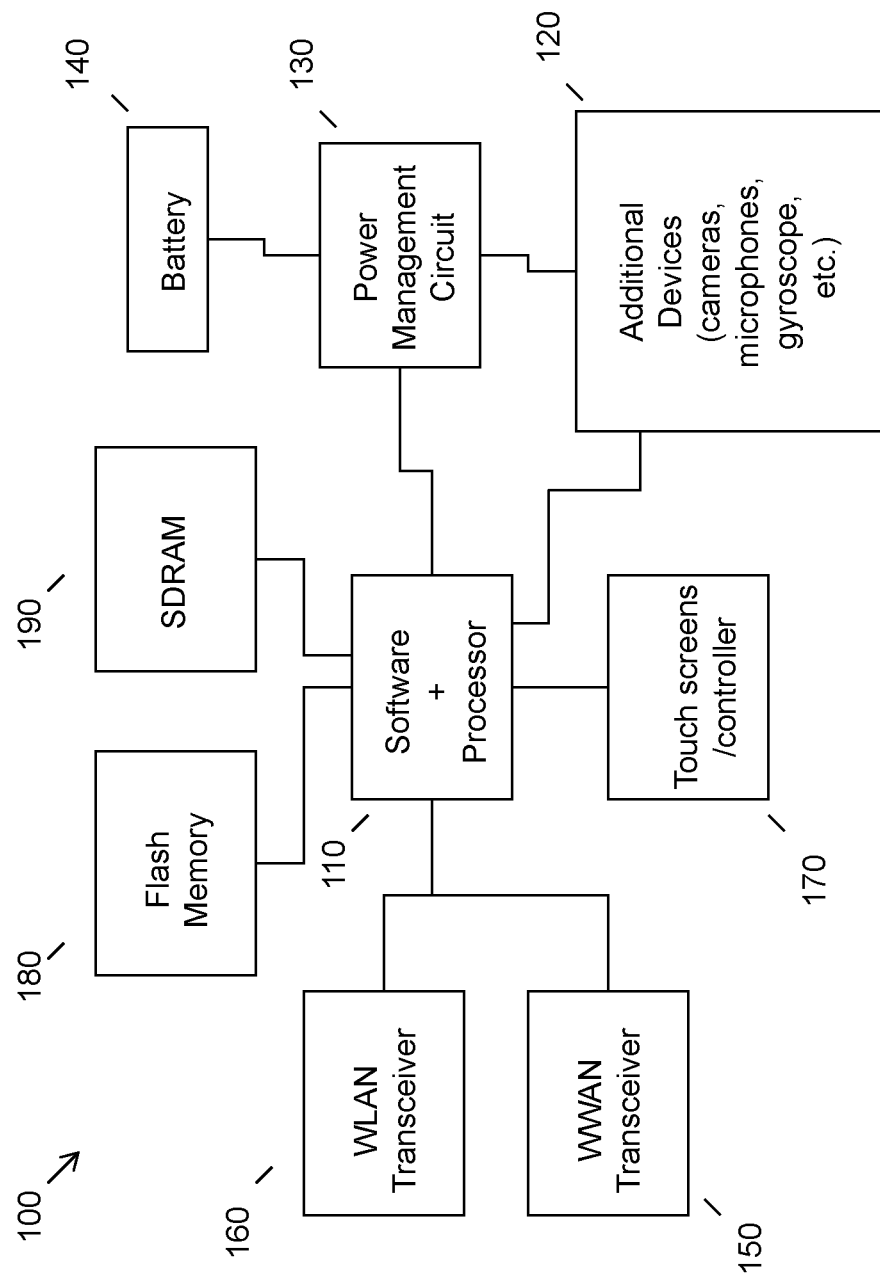
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Backup protocols for devices that transmit unsaved local data to a secure storage location are generally subject to various user or administrator conditions. For instance, certain devices may require that a specific connection type be available prior to the transmission of the local data. For example, a Wi-Fi connection may be required rather than a mobile network connection to reduce data usage and/or cost. Additionally, these backup protocols may be configured to transmit the local data at predetermined intervals and/or to predetermined locations.

Despite these safeguards, situations may still arise in which the conditions required for data backup may cause the local data to be lost. For example, a traveling user (e.g., on a road trip, an outdoor adventure, on another type of trip, etc.) that has captured a variety of different types of media (e.g., pictures, video, etc.) on their trip may not have access to a Wi-Fi connection. In this instance, the captured media may be permanently lost if the user loses or damages their device. Therefore, a solution is needed that may dynamically adjust backup protocols based at least in part on a user's contextual situation and/or the importance of the captured media.

Accordingly, an embodiment provides a method for adjusting a data backup protocol based at least in part on a determined loss potential of captured data. In an embodiment, an indication of unsaved data may be received by a device. An embodiment may then determine whether a loss potential for the unsaved data necessitates an adjustment to a backup protocol of the device. Responsive to determining that it does, an embodiment may adjust the backup protocol based on one or more different criteria. Such a method may better protect unsaved data by leveraging analytics to override conventional backup routines.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, motion sensor such as an accelerometer or gyroscope, etc. System 100 often includes one or more touch screens 170 for data input and display/rendering. System 100 also typically includes various memory devices, for example flash memory 180 and SDRAM 190.

Figure 2:
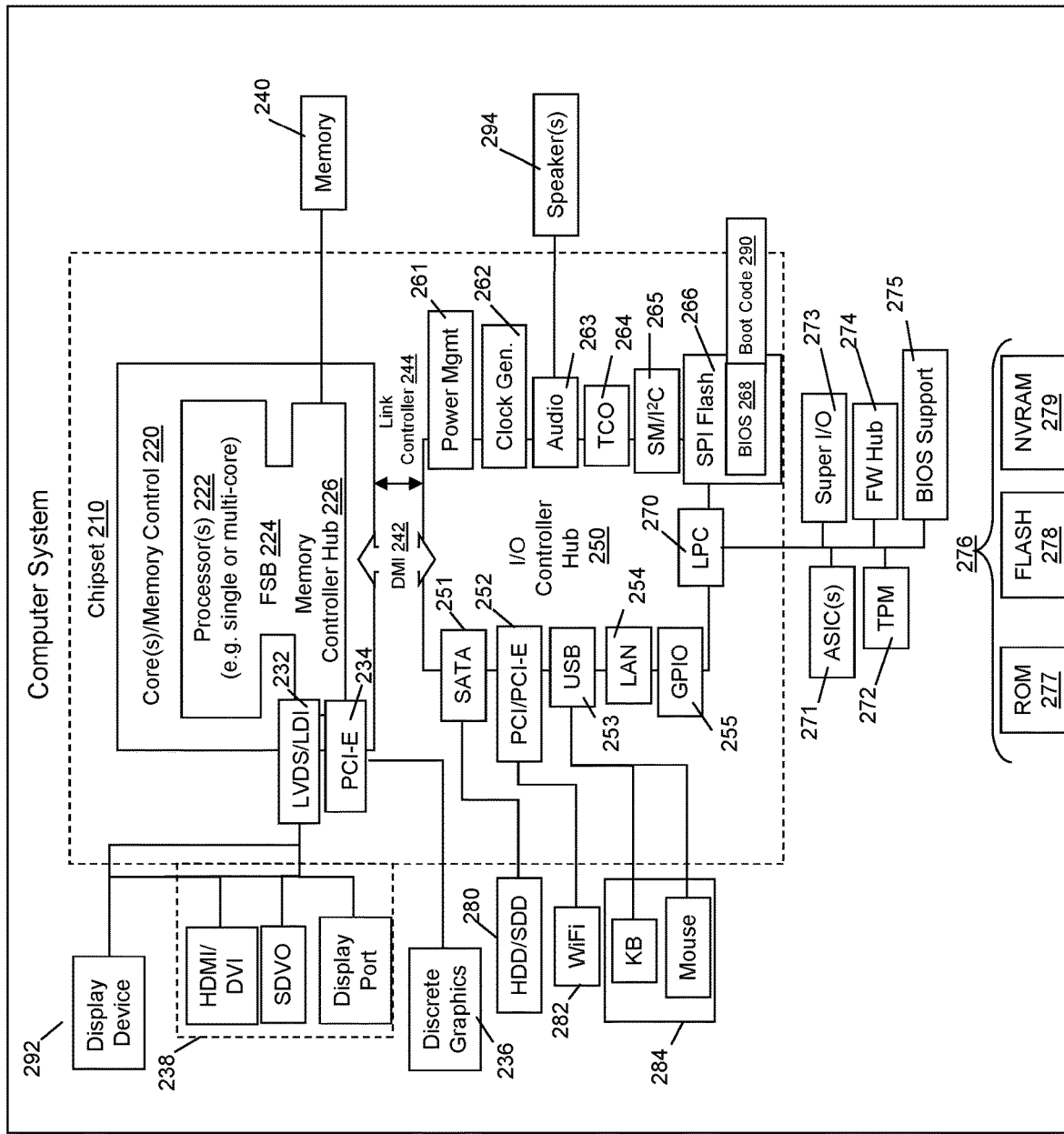
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, laptops, and/or electronic devices that may be capable of dynamically backing up local, unsaved data. For example, the circuitry outlined in FIG. 1 may be implemented in a tablet or smart phone embodiment, whereas the circuitry outlined in FIG. 2 may be implemented in a laptop.

Figure 3:
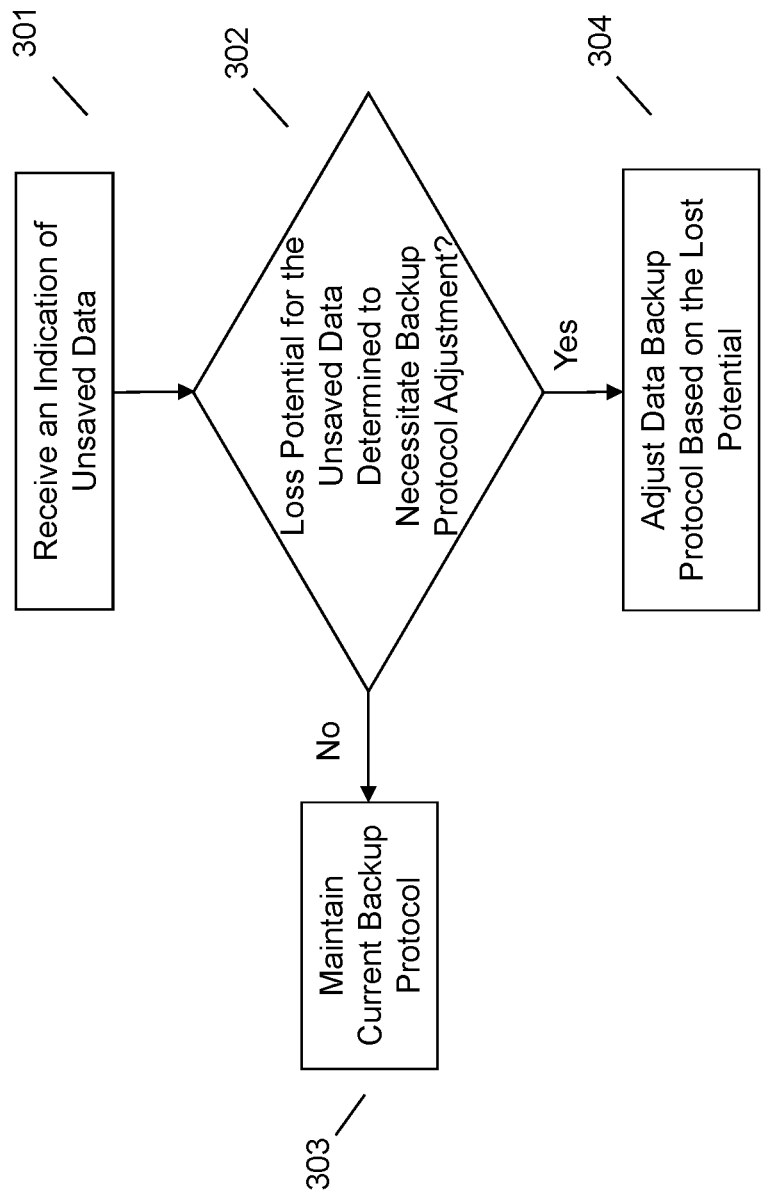
FIG. 3 illustrates an example method of protecting unsaved data.

Referring now to FIG. 3, an embodiment may analyze various types of context data to adjust one or more backup routines of a device. At 301, an embodiment may receive an indication of unsaved data. In the context of this application, unsaved data may correspond to virtually any type of created or captured content (e.g., images, videos, documents, other types of data, a combination thereof, etc.) that has not been transmitted (e.g., via a wired or wireless connection, etc.) to a storage location (e.g., another device, another server, cloud storage, etc.). In an embodiment, the indication may be derived each time new content is created. In another embodiment, the indication may be derived each time an embodiment identifies that new content has been created and not backed up to another save location after a predetermined amount of time (e.g., 1 minute, 5 minutes, 10 minutes, etc.).

At 302, an embodiment may determine whether an identified loss potential for the unsaved data necessitates an adjustment to a backup protocol for the device. In the context of this application, a loss potential may correspond to an objective value (e.g., between 1-10, between 1-100, etc.) or percentage representing a likelihood the unsaved data may be lost. An embodiment may conclude that the backup protocol needs to be adjusted responsive to identifying that the loss potential exceeds a predetermined threshold value or percentage (e.g., set by a manufacturer, adjusted by a user, etc.).

In an embodiment, the determination may comprise identifying a contextual situation associated with the unsaved data. The contextual situation may correspond to a user activity, an environmental event affecting or in proximity to the user, a configuration of the user's device, a content type of the unsaved data, a combination of the foregoing, and the like. With respect to user activities and environmental events, the identification of the contextual situation may be conducted by analyzing and considering one or more types of data such as calendar data (e.g., scheduled events on a user's calendar, etc.), message data (e.g., a user's text messages, emails, social media communications, etc.), location data (e.g., global position system (GPS) data, etc.), weather data (e.g., from a weather application or source, etc.), current news data (e.g., from a news application or source, etc.), and device history data. As an example of the foregoing, an embodiment may identify that a strong storm is approaching the user by accessing weather data. In another example, an embodiment may identify that a user is engaged in a cycling activity by identifying a calendar entry that states "cycling at 10 AM". In yet another example, an embodiment may identify that a user is engaged in a sea-faring activity (e.g., fishing, kayaking, etc.) by utilizing GPS location data.

In an embodiment, a contextual situation related to a device configuration may refer to one or more of an orientation of the user device, a connection and/or attachment of the user device with another device, etc. In an embodiment, connection and/or attachment to other devices may be identified using one or more different connection/attachment detection techniques (e.g., radio-frequency identification (RFID), near-field communication (NFC) between devices, etc.)

In an embodiment, a contextual situation related to a content type may correspond to an identification of whether the content is work-related content, leisure-related content, etc. For example, if an embodiment identifies that a user has created content at a location known to be associated with a user's work location or a time known to be associated with conventional work hours and/or days (e.g., 9 AM-5 PM on Monday-Friday, etc.), an embodiment may classify that content as work-related content. Alternatively, if an embodiment identifies that a user has created content (e.g., captured an image, recorded a video, etc.) at a location known to be associated with a user's home or another recreational area (e.g., a park, etc.) or a time known to be associated with conventional break hours or days (e.g., lunch breaks, weekend days, etc.), an embodiment may classify that content as leisure-related content. Additionally or alternatively, an embodiment may employ one or more content analysis techniques (e.g., image analysis, video analysis, text analysis, etc.) to identify whether the content is work or leisure related. For example, an image determined to be of a user's family may be designated as leisure-related content whereas a document comprising various financial projections may be designated as a work-related content.

It is important to note that the aforementioned context data types and examples are not limiting and a person having ordinary skill in the art will realize that other data sources for identifying a user's contextual situation not explicitly discussed herein may also be utilized.

Responsive to identifying a contextual situation associated with the unsaved data, an embodiment may assign a loss potential to the unsaved data associated with that situation. The loss potential may be assigned, for example, by first accessing a loss potential database (e.g., stored locally on the device, remotely on another device or server, etc.) comprising loss potential values for unsaved data associated with a plurality of known contextual situations. In an embodiment, the loss potential database may be updated manually by a user or may be dynamically updated as new contextual situations are learned. An embodiment may then identify whether the current contextual situation associated with the unsaved data matches a known contextual situation in the database. If a match is found, an embodiment may attach the loss potential for the matched known contextual situation to the unsaved data in the current contextual situation. Thereafter, an embodiment may compare the loss potential assigned to the unsaved data associated with the current contextual situation to a predetermined threshold. If the loss potential for the unsaved data is greater than the predetermined threshold, an embodiment may determine that the contextual situation necessitates an adjustment of a backup protocol of the device.

Responsive to determining, at 302, that the loss potential for the unsaved data does not necessitate an adjustment to the backup protocol, an embodiment may, at 303, maintain the current backup protocol. Conversely, responsive to determining, at 302, that the loss potential for the unsaved data necessitates an adjustment to the backup protocol, an embodiment may, at 304, adjust the backup protocol. In the context of this application, an adjustment to the backup protocol may refer to a change in the way local data is saved to another source. More particularly, an adjustment to the backup protocol may correspond to an adjustment in the frequency that local, unsaved data is saved to another source, a change in the number and/or type of sources that the local, unsaved data is saved to, a change in the transmission medium(s) used to transmit the local, unsaved data to another source, a prioritization of saving pieces of local, unsaved data over other pieces of local, unsaved data, a combination thereof, and the like. In an embodiment, the adjustment may occur automatically without any additional user input.

In an embodiment, the type of adjustment may correspond to a degree of the loss potential of the unsaved data. Stated differently, different types of unsaved data having a loss potential greater than the threshold amount may demand different backup protocols. For instance, unsaved data with a greater loss potential may demand a more urgent backup protocol than unsaved data with a lower loss potential. For example, an embodiment may identify that an approaching tornado may represent a greater loss potential for unsaved data on a device than an upcoming cycling trip. In this situation, the unsaved data associated with the approaching tornado may require that the backup process be expedited and the unsaved data be transmitted to another source not experiencing a tornado threat whereas the unsaved data associated with the upcoming cycling trip may only require that the unsaved data be transmitted to another source prior to the beginning of the cycling trip.

In an embodiment, the type of unsaved data may dictate the type of backup protocol. For example, unsaved, work-related data may be backed up substantially each time the work-related content is created (e.g., each time a sentence is completed, each time an image is captured, etc.) or at more frequent intervals than an existing backup protocol requires. Alternatively, unsaved, leisure-related data may not demand such an aggressive backup protocol In another embodiment, the quantity of a type of unsaved data may influence the backup protocol. For instance, if an embodiment identifies that ten, unsaved images all have a loss potential greater than the threshold amount, but five of the images are of one object and the other five images are of different and distinct objects, an embodiment may prioritize the backing up of the images as follows: the clearest image of the five images of the single object, the five images of different objects (e.g., based on order of creation, etc.), and then the remaining four images of the single object (e.g., based on order of creation, etc.).

In an embodiment, the adjustment may be dependent on certain user permissions. For example, an embodiment may identify that a loss potential for a piece of unsaved data necessitates that the unsaved data be transmitted over a user's mobile network (e.g., a 4G network, etc.) if a Wi-Fi connection is unavailable. In this situation, a user may designate an amount of mobile data that may be consumed by the adjusted backup protocol. In an embodiment, the data amount may correspond to a percentage of data (e.g., allow up to 75% of allotted data to be consumed, allow up to 75% of remaining data to be consumed, etc.) or a static value (e.g., allow up to 1.5 gigabytes of data to be consumed, etc.). In an embodiment, a user may designate certain types of unsaved data as not being subject to any data consumption constraints. For example, if a loss potential for a piece of unsaved data is greater than a high importance threshold, an embodiment may identify that the piece of unsaved data is very important. In this situation, a backup transmission process may consume as much data as needed to transmit the important unsaved data to another source, even if the transmission process results in additional cost to the user (e.g., by exceeding a user's allotted data consumption limit, etc.).

In an embodiment, the backup protocol may be adjusted based upon predicted signal strength of a device in a destination area. For example, an embodiment may have access to a coverage map that may identify that a destination area (e.g., identified from one or more contextual data sources described above, etc.) has little to no mobile data coverage. In this situation, an embodiment may transmit the unsaved data having a loss potential greater than the predetermined threshold to another source while mobile data is still available (i.e., prior to a user reaching the destination area).

In an embodiment, the backup protocol may be adjusted based upon a detected battery level and/or drain rate of the device comprising the unsaved data. For example, an embodiment may transmit unsaved data having a loss potential greater than the predetermined threshold to another source responsive to identifying that a detected battery level of the user's device has fallen below a predetermined power level (e.g., fallen below 20%, etc.). In another example, an embodiment may transmit all unsaved data, regardless of loss potential value, to another source responsive to identifying that the battery level of the user's device has fallen below a predetermined threshold.

In an embodiment, the unsaved data having a loss potential greater than the predetermined threshold may be transmitted to another, proximate device expected to have a lower loss potential than the unsaved data on the user's device. For example, the other device may be a stationary device such as a personal computer or a laptop that may not be subject to the same dangers as a user's device during a trip.

The various embodiments described herein thus represent a technical improvement to conventional data backup techniques. Using the techniques described herein, an embodiment may receive an indication of unsaved data on a device. An embodiment may then determine whether an identified loss potential for the unsaved data necessitates an adjustment to a backup protocol for the device. In this regard, an embodiment may determine whether the loss potential for the unsaved data exceeds a predetermined threshold amount. Responsive to determining that it does, an embodiment may conclude that a backup protocol for the device should be adjusted. Such a method may ensure that backup protocols for unsaved, local data on a device are not simply static, but rather, are dynamically adjusted based on contextual situations facing the user and/or the user's device.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at an information handling device, an indication of unsaved data present on the information handling device, wherein the unsaved data comprises a plurality of items of an identical type as well as at least one other item of a different type;
   identifying a contextual situation associated with the information handling device;
   assigning a loss potential to the unsaved data based upon the contextual situation;
   determining, using a processor, that the loss potential for the unsaved data necessitates an adjustment to a backup protocol for the information handling device; and
   adjusting, responsive to the determining, the backup protocol, wherein the adjusting comprises:
      identifying a highest quality item of the plurality of items of the identical type; and
      dynamically transmitting the unsaved data to an external storage repository, wherein the dynamically transmitting comprises:
         initially transmitting the highest quality item of the plurality of items of the identical type to the external storage repository;
         subsequently transmitting the at least one other item of the different type to the external storage repository; and
         lastly transmitting, based upon an order of creation, remaining items of the plurality of items of the identical type to the external storage repository.

2. The method of claim 1, wherein the determining comprises identifying whether the loss potential is greater than a predetermined threshold.

3. The method of claim 1, wherein the contextual situation comprises at least one more of: a user activity, a configuration of the information handling device, and a content type of the unsaved data.

4. The method of claim 1, wherein the identifying comprises identifying using data selected from the group consisting of calendar data, message data, location data, weather data, news data, device configuration data, content data, and device history data.

5. The method of claim 1, wherein the adjusting comprises adjusting based on one or more user preferences.

6. The method of claim 1, wherein the adjusting comprises adjusting based on at least one of: a content type of the unsaved data and a quantity of the unsaved data.

7. The method of claim 1, wherein the adjusting comprises adjusting based on a detected battery level.

8. The method of claim 1, wherein the adjusting comprises prioritizing saving of the unsaved data based upon a degree of the loss potential.

9. The method of claim 1, wherein the adjusting comprises increasing, based upon a destination low-signal indication, a speed by which the unsaved data is saved.

10. An information handling device, comprising:
    a non-transitory memory device that stores instructions executable by the processor to:
    receive an indication of unsaved data present on the information handling device, wherein the unsaved data comprises a plurality of items of an identical type as well as at least one other item of a different type;
    identify a contextual situation associated with the information handling device;
    assign a loss potential to the unsaved data based upon the contextual situation;
    determine that the loss potential for the unsaved data necessitates an adjustment to a backup protocol for the information handling device; and
    adjust, responsive to the determining, the backup protocol, wherein the adjusting comprises:
       identifying a highest quality item of the plurality of items of the identical type; and
       dynamically transmitting the unsaved data to an external storage repository, wherein the dynamically transmitting comprises:
          initially transmitting the highest quality item of the plurality of items of the identical type to the external storage repository;
          subsequently transmitting the at least one other item of the different type to the external storage repository; and
          lastly transmitting, based upon an order of creation, remaining items of the plurality of items of the identical type to the external storage repository.

11. The information handling device of claim 10, wherein the instructions executable by the processor to determine comprise instructions executable by the processor to identify whether the loss potential is greater than a predetermined threshold.

12. The information handling device of claim 10, wherein the contextual situation comprises at least one more of: a user activity, a configuration of the information handling device, and a content type of the unsaved data.

13. The information handling device of claim 10, wherein the instructions executable by the processor to identify comprise instructions executable by the processor to identify using data selected from the group consisting of calendar data, message data, location data, weather data, news data, device configuration data, content data, and device history data.

14. The information handling device of claim 10, wherein the instructions executable by the processor to adjust comprise instructions executable by the processor to adjust based on one or more user preferences.

15. The information handling device of claim 10, wherein the instructions executable by the processor to adjust comprise instructions executable by the processor to adjust based on at least one of: a content type of the unsaved data and a quantity of the unsaved data.

16. The information handling device of claim 10, wherein the instructions executable by the processor to adjust comprise instructions executable by the processor to adjust based on a detected battery level.

17. The information handling device of claim 10, wherein the instructions executable by the processor to adjust comprise instructions executable by the processor to prioritize saving of the unsaved data based upon a degree of the loss potential.

18. A product, comprising:
a non-transitory storage device that stores code, the code being executable by a processor and comprising:
code that receives an indication of unsaved data present on an information handling device, wherein the unsaved data comprises a plurality of items of an identical type as well as at least one other item of a different type;
code that identifies a contextual situation associated with the information handling device;
code that assigns a loss potential to the unsaved data based upon the contextual situation;
code that determines that the loss potential for the unsaved data necessitates an adjustment to a backup protocol; and
code that adjusts, responsive to the determining, the backup protocol, wherein the code that adjusts comprises:
code that identifies a highest quality item of the plurality of items of the identical type; and
code that dynamically transmits the unsaved data one or more items having an importance designation greater than a predetermined threshold to an external storage repository, wherein the code that dynamically transmits comprises code that:
initially transmits the highest quality item of the plurality of items of the identical type to the external storage repository;
subsequently transmits the at least one other item of the different type to the external storage repository; and
lastly transmits, based upon an order of creation, remaining items of the plurality of items of the identical type to the external storage repository.

* * * * *